United States Patent
Kim et al.

(10) Patent No.: US 12,074,548 B2
(45) Date of Patent: Aug. 27, 2024

(54) ELECTRIFIED VEHICLE AND METHOD OF CONTROLLING SAME

(71) Applicants: Hyundai Motor Company, Seoul (KR); Kia Corporation, Seoul (KR)

(72) Inventors: Myung Ho Kim, Incheon (KR); Young Seul Lim, Seoul (KR); Sang Cheol Shin, Suwon-si (KR); Kang Ho Jeong, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/117,686

(22) Filed: Mar. 6, 2023

(65) Prior Publication Data
US 2024/0039448 A1    Feb. 1, 2024

(30) Foreign Application Priority Data

Jul. 26, 2022    (KR) .................. 10-2022-0092535

(51) Int. Cl.
*H02P 27/06*    (2006.01)
*B60L 3/00*    (2019.01)
(Continued)

(52) U.S. Cl.
CPC ............. *H02P 27/06* (2013.01); *B60L 3/003* (2013.01); *B60L 53/22* (2019.02); *H02J 7/00308* (2020.01); *H02J 7/007* (2013.01); *H02M 1/0054* (2021.05); *H02M 1/348* (2021.05); *H02M 7/539* (2013.01); *H02P 29/0241* (2016.02)

(58) Field of Classification Search
CPC ...... H02P 27/06; H02P 29/0241; B60L 53/22; B60L 3/003; H02J 7/00308; H02J 7/007; H02M 1/0054; H02M 1/348; H02M 7/539
USPC .................................... 307/9.1, 10.1
See application file for complete search history.

(56) References Cited

U.S. PATENT DOCUMENTS

2018/0019684 A1    1/2018    Yamashita et al.
2019/0193581 A1    6/2019    Beulich
(Continued)

FOREIGN PATENT DOCUMENTS

| JP | 2016-123199 A | 7/2016 |
| JP | 2018-121375 A | 8/2018 |
| JP | 2019-146354 A | 8/2019 |

*Primary Examiner* — Hal Kaplan
(74) *Attorney, Agent, or Firm* — Morgan, Lewis & Bockius LLP

(57) ABSTRACT

An electrified vehicle having a first inverter having a DC terminal and a plurality of legs respectively connected to one end of each of a plurality of coils of a motor, a second inverter connected to the DC terminal, and including a plurality of legs connected to the other ends of the plurality of coils, respectively, a plurality of transfer switches respectively having one end connected to a neutral terminal for the plurality of coils and the other end connected to the other end of each coil, an overvoltage protection circuit including a clamping switch, a resistor, and a capacitor, and connected to the neutral terminal and the DC terminal, and a controller controlling a turned-on state of the plurality of transfer switches according to the motor driving mode. When the motor is driven, the controller controls a turned-on state of the clamping switch.

20 Claims, 8 Drawing Sheets

(51) Int. Cl.
 *B60L 53/22* (2019.01)
 *H02J 7/00* (2006.01)
 *H02M 1/00* (2007.01)
 *H02M 1/34* (2007.01)
 *H02M 7/539* (2006.01)
 *H02P 29/024* (2016.01)

(56) References Cited

U.S. PATENT DOCUMENTS

2021/0265937 A1 8/2021 Kashiwazaki et al.
2023/0073159 A1* 3/2023 Lee .................... H02M 7/493
2023/0170830 A1* 6/2023 Lee .................... H02P 21/22
                                                    318/811

* cited by examiner

ELECTRIFIED VEHICLE AND METHOD OF CONTROLLING SAME

CROSS REFERENCE TO RELATED APPLICATION

The present application claims priority to Korean Patent Application No. 10-2022-0092535, filed on Jul. 26, 2022, the entire contents of which are incorporated herein for all purposes by reference.

BACKGROUND

Technical Field

The present disclosure relates generally to an electrified vehicle and a method of controlling the same.

Description of the Related Art

Recently, along with the global trend of reducing carbon dioxide emissions, the consumption of electrified vehicles that generate driving power by driving a motor from electric energy stored in an energy storage device, such as a battery, is significantly increasing, in place of typical internal combustion engine (ICE) vehicles that generate driving power through combustion of fossil fuel.

An electrified vehicle is provided with an inverter for driving a motor. In general, a coil of each phase included in the motor forms a Y-connection, with one end thereof being connected to one inverter, and the other ends thereof being connected to each other.

When the motor is operating, a switch in the inverter applies a line voltage to the coil of the Y-connected motor while being turned on/off by pulse-width modulation (PWM) control. Consequently, the coil generates AC current, thereby generating torque.

Fuel efficiency (or energy efficiency) of an electrified vehicle using torque generated by the motor in this manner is determined by power conversion efficiency of the inverter and the motor. Thus, it is important to maximize the power conversion efficiency of the inverter and the efficiency of the motor in order to improve the fuel efficiency.

The efficiency of the inverter-motor system is mainly determined by the voltage use ratio of the inverter. When a driving point of a vehicle determined by the relationship between a motor speed and torque is formed in a section in which the voltage use rate is high, fuel efficiency of the vehicle may be improved.

However, when the number of coils of the motor is increased to increase the maximum torque of the motor, the section in which the voltage use rate is high may be further away from a low torque area, i.e., a major driving point of the vehicle, thereby reducing fuel efficiency, which is problematic. In addition, when the motor is designed such that major driving points are included in the section in which the voltage use rate is high in terms of fuel efficiency, there may be a limit to the maximum torque of the motor, thereby degrading accelerated departure performance of the vehicle, which is problematic.

In this technical field, as a motor driving technology capable of improving the efficiency of a system while covering both a low power section and a high power section using a single motor is required, a technology for driving a single motor in two different modes using two inverters and a mode transfer switch has been introduced recently.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to disclose a neutral terminal voltage of a motor when driving the motor in order to reduce the difference of the voltage between both ends of a transfer switch that operates according to the motor driving mode, thereby reducing loss to a motor driving system including the transfer switch.

Objectives to be obtained in the present disclosure are not limited to the aforementioned objectives, and other objectives not explicitly disclosed herein will be clearly understood by those skilled in in the art from the description provided hereinafter.

In order to achieve the above objective, according to one aspect of the present disclosure, there is provided an electrified vehicle including: a motor including a plurality of coils; a first inverter having a DC terminal, and including a plurality of legs respectively connected to one end of each of the plurality of coils; a second inverter connected to the DC terminal, and including a plurality of legs respectively connected to the other end of each of the plurality of coils; a plurality of transfer switches respectively having one end connected to a neutral terminal for the plurality of coils and the other end connected to the other end of each of the plurality of coils; an overvoltage protection circuit including a clamping switch, a resistor, and a capacitor, and connected to the neutral terminal and the DC terminal; and a controller controlling a turned-on state of the plurality of transfer switches according to a motor driving mode. When the motor is driven, the controller may control a turned-on state of the clamping switch.

Also provided is a method of controlling an electrified vehicle. The method may include: controlling, by a controller in response to driving a motor having a plurality of coils, a turned-on state of a clamping switch connected to a neutral terminal for the plurality of coils and DC terminals of first and second inverters; and controlling, by the controller, a turned-on state of a plurality of transfer switches connected to the neutral terminal and the other ends of the plurality of coils according to a motor driving mode. The first inverter may be connected to one end of each of the plurality of coils, and the second inverter may be connected to the other ends of the plurality of coils.

The present disclosure may disclose a neutral terminal voltage of a motor when driving the motor in order to reduce the difference of the voltage between both ends of the transfer switch that operates according to the motor driving mode, thereby reducing loss to a motor driving system including the transfer switch.

In addition, according to the present disclosure, the overvoltage protection circuit for limiting the neutral terminal voltage of the motor may be configured using the input capacitor and the discharge resistor for stably charging the battery. In this manner, it is possible to reduce the number of components and the area of the overvoltage protection circuit.

Furthermore, according to the present disclosure, the overvoltage protection circuit is provided with the charge switch operating according to whether or not the battery is charged. Thus, when a malfunction occurs in the transfer switch while the battery is being charged, it is possible to reduce loss to the overvoltage protection circuit.

Effects obtainable from the present disclosure are not limited to the aforementioned effects, and other effects not explicitly disclosed herein will be clearly understood by those skilled in in the art from the description provided hereinafter.

BRIEF DESCRIPTION OF THE DRAWINGS

The accompanying drawings of this specification are provided to illustrate exemplary embodiments of the present disclosure and aid in the understanding of the technical principle of the present disclosure together with the following detailed description, and it should not be understood that the present disclosure is construed as being limited to the drawings.

DETAILED DESCRIPTION

Figure 1:
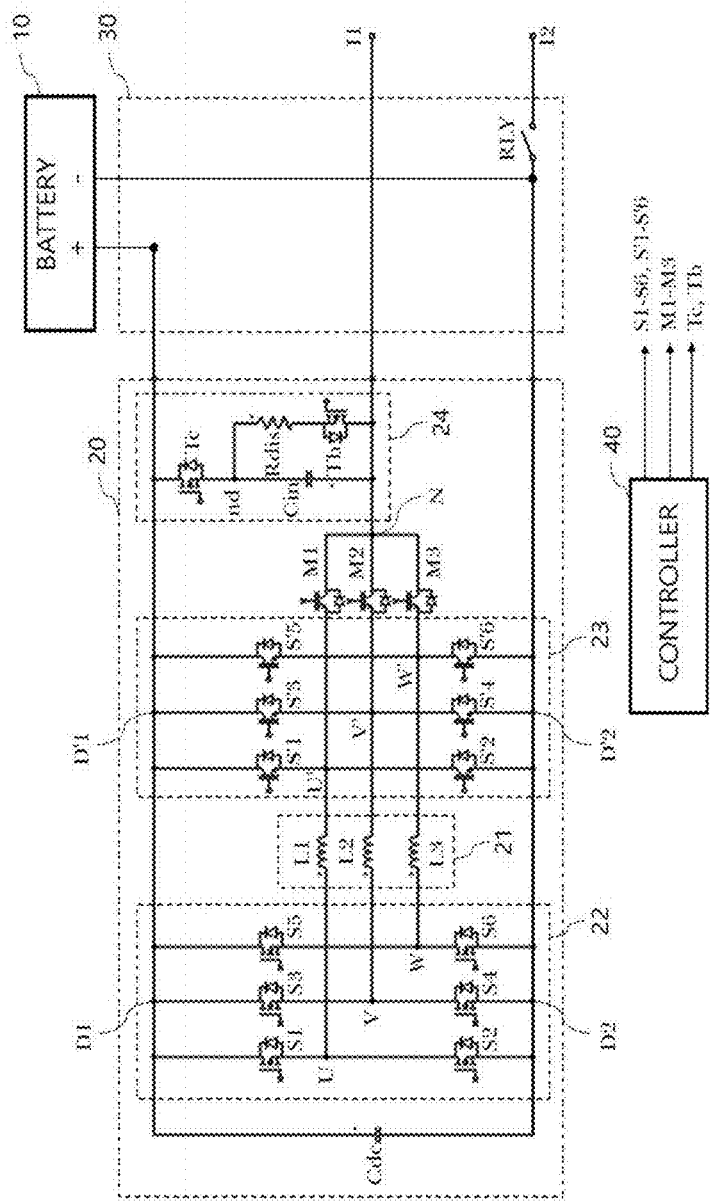
FIG. 1 is a diagram illustrating a motor driving system of an electrified vehicle according to an embodiment of the present disclosure.

Hereinafter, embodiments disclosed in the present disclosure will be described in detail with reference to the accompanying drawings, in which identical or similar constituent elements are given the same reference numerals regardless of the reference numerals of the drawings, and a repeated description thereof will be omitted.

In the description of the following embodiments, the term "predetermined" indicates that the numerical value of a parameter is previously determined when the parameter is used in a process or an algorithm. In some embodiments, the numerical value of the parameter may be set when the processor or the algorithm is started or in a section in which the processor or the algorithm is executed.

The component suffixes "module" and "part" used in the following description are given or mixed together only considering the ease of creating the specification, and have no meanings or roles that are distinguished from each other by themselves.

In the description of the present disclosure, when it is determined that the detailed description of the related art would obscure the gist of the present disclosure, the detailed description thereof will be omitted. In addition, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It will be understood that, although the terms "first", "second", etc., may be used herein to describe various elements, these elements should not be limited by these terms. These terms are only used to distinguish one element from another element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present.

As used herein, the singular forms "a", "an", and "the" are intended to include the plural forms as well, unless the context clearly indicates otherwise.

It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

FIG. 1 is a diagram illustrating a motor driving system of an electrified vehicle according to an embodiment of the present disclosure. As illustrated in FIG. 1, the electrified vehicle may include a battery 10 having a positive terminal (+) and a negative terminal (−), a motor driving device 20, a junction block 30, and a controller 40. The junction block 30 electrically connects the motor driving device 20 and input terminals I1 and I2 to which an external DC voltage with which the battery 10 is to be charged is applied. The junction block 30 may include a charge relay RLY controlling an electrical connection state between the negative terminal (−) of the battery 10 and the input terminal I2.

The motor driving device 20 may include a motor 21, a first inverter 22, a second inverter 23, a plurality of transfer switches M1 to M3, and an overvoltage protection circuit 24.

The motor 21 may have a plurality of coils L1, L2, and L3 corresponding to a plurality of phases, respectively.

The first inverter 22 may have AC terminals U, V, and W corresponding to the plurality of phases, respectively, and DC terminals D1 and D2 connected to the positive terminal (+) and the negative terminal (−) of the battery 10, respectively. The first inverter 22 may include a plurality of legs S1-S2, S3-S4, and S5-S6 respectively connected to one end of a corresponding one of the plurality of coils L1, L2, and L3. Each of the plurality of legs S1-S2, S3-S4, and S5-S6 may be connected to the DC terminals D1 and D2, and the plurality of legs S1-S2, S3-S4, and S5-S6 may be connected to the AC terminals U, V, and W, respectively, in a corresponding manner. Each of the legs as disclosed in the present embodiment means a connection configuration of a plurality of switch elements a configuration in which a plurality of switch elements are connected. Each of the plurality of switch elements may be implemented as a transistor. A DC capacitor Cdc may be disposed to connect the DC terminals D1 and D2.

The second inverter 23 may have AC terminals U', V', and W' corresponding to the plurality of phases, respectively, and DC terminals D'1 and D'2 connected to the DC terminals D1 and D2 of the first inverter 22, respectively. The second inverter 23 may include a plurality of legs S'1-S'2, S'3-S'4, and S'5-S'6 connected to the other ends of the plurality of coils L1, L2, and L3, respectively. Each of the plurality of legs S'1-S'2, S'3-S'4, and S'5-S'6 may be connected to the DC terminals D'1 and D'2, and the plurality of legs S'1-S'2, S'3-S'4, and S'5-S'6 may be connected to the AC terminals U', V', and W', respectively, in a corresponding manner.

One end of each of the plurality of transfer switches M1 to M3 may be connected to a neutral terminal N of the plurality of coils L1, L2, and L3, whereas the other ends of the plurality of transfer switches M1 to M3 may be connected to the other ends of plurality of coils L1, L2, and L3, respectively. Each of the plurality of transfer switches M1 to M3 may be implemented as a transistor.

The turned-on state of the plurality of transfer switches M1 to M3 may be controlled by the controller 40 according to the motor driving mode. The controller 40 may be implemented in the form of hardware, software, or a combination of hardware and software, or may be implemented as microprocessor, and may be, e.g., an electronic control unit (ECU), a micro controller unit (MCU), or other sub-controllers mounted in the vehicle. The motor driving mode may include a closed-end winding (CEW) mode and an open-end winding (OEW) mode.

The CEW mode refers to a mode in which the other ends of the plurality of coils L1, L2, and L3 of the motor 21 are electrically connected to the neutral terminal N, and the motor 21 is efficiently driven in a low power range only using the first inverter 22. In contrast, the OEW mode refers to a mode in which the other ends of the plurality of coils L1, L2, and L3 of the motor 21 are electrically separated from the neutral terminal N, and the driving force of the motor 21 is enhanced in a high power range not only using the first inverter 22 but also the second inverter 23.

When the motor driving mode is set to the CEW mode, the controller 40 may turn on the plurality of transfer switches M1 to M3, switch the plurality of legs S1-S2, S3-S4, and S5-S6 of the first inverter 22, and control switch elements S'1 to S'6 of the second inverter 23 to be in an electrically non-conductive state in order to form a neutral point of the plurality of coils L1, L2, and L3. In the present embodiment, the description of "switching a leg" may be interpreted as meaning a plurality of switch elements of the leg are switched in a complementary manner.

When the motor driving mode is set to the OEW mode, the controller 40 may turn off the plurality of transfer switches M1 to M3 so that the plurality of coils L1, L2, and L3 form no neutral point, and switch not only the plurality of legs S1-S2, S3-S4, and S5-S6 of the first inverter 22 but also the plurality of legs S'1-S'2, S'3-S'4, and S'5-S'6 of the second inverter 23.

There is a pattern having parasitic inductance between the switch elements of the first and second inverters 22 and 23. The parasitic inductance may induce a peak voltage higher than the voltage of the battery 10 to the AC terminals U, V, and W of the first inverter 22 and the AC terminals U', V', and W' of the second inverter 23 in response to changes in current caused by switching of the legs of the first and second inverters 22 and 23.

The peak voltage caused by the parasitic inductance may be generated as body capacitors (i.e., parasitic capacitors) of bottom switch elements S2, S4, and S6 and body capacitors of bottom switch elements S'2, S'4, and S'6 in a turned-off state are charged.

Different from the CEW mode, in the OEW mode, current output from the body capacitors of the bottom switch elements S'2, S'4, and S'6 may charge body capacitors of the plurality of transfer switches M1 to M3 in a turned-off state. Consequently, the voltage of the neutral terminal N may be increased whenever the bottom switch elements S'2, S'4, and S'6 of the second inverter 23 are sequentially turned off in the OEW mode.

That is, in the OEW mode, as the voltage of the neutral terminal N increases, the voltage difference between both terminals of each of the plurality of transfer switches M1 to M3 may be increased, thereby causing loss to the plurality of transfer switches M1 to M3.

Accordingly, the present embodiment discloses an overvoltage protection circuit 24 configured to reduce the voltage difference between both terminals of each of the plurality of transfer switches M1 to M3 in the OEW mode by limiting the upper limit of the voltage of the neutral terminal N when the motor 21 is driven, thereby reducing loss to the motor driving device 20 including the plurality of transfer switches M1 to M3.

In addition, in the present embodiment, the overvoltage protection circuit 24 may be configured using an input capacitor Cin and a discharge resistor Rdis for stably charging the battery 10 so as to reduce the number of elements and the area of the overvoltage protection circuit 24.

The overvoltage protection circuit 24 may include the input capacitor Cin, the discharge resistor Rdis, a clamping switch Tc, and a charge switch Tb, and may be connected to the neutral terminal N and the DC terminals D1 and D'1.

The input capacitor Cin and the discharge resistor Rdis may be connected in parallel to an internal node nd and the neutral terminal N, stably maintain the voltage of the battery 10, and reduce ripples occurring in the current of the battery 10. In addition, according to the present embodiment, the discharge resistor Rdis may discharge charges from the neutral terminal N to the internal node nd in the OEW mode when the motor 21 is driven, and the input capacitor Cin may constantly maintain the voltage difference between the neutral terminal N and internal node nd.

The clamping switch Tc may be connected to the internal node nd and DC terminals D1 and D'1. An anode of a body diode (i.e., a parasitic diode) of the clamping switch Tc may be connected to the internal node nd, and a cathode of the body diode of the clamping switch Tc may be connected to the DC terminals D1 and D'1.

When the motor 21 is driven, the controller 40 may control the turned-on state of the clamping switch Tc, thereby limiting the upper limit of the voltage of the neutral terminal N.

More specifically, when the motor 21 is driven, the controller 40 may turn off the clamping switch Tc so that current from the neutral terminal N flows to the DC terminals D1 and D'1 through the body diode of the clamping switch Tc. When the potential difference between the internal node nd and the DC terminals D1 and D'1 exceeds a threshold voltage, the body diode of the clamping switch Tc may be electrically conductive. Consequently, the upper limit of the voltage of the neutral terminal N may be limited to a sum of the voltage of the battery 10 and the voltage of the capacitor Cin.

That is, when the clamping switch Tc is turned off, the overvoltage protection circuit 24 may serve as a register/capacitor/diode (RCD) snubber circuit, and reduce the voltage difference between both terminals of each of the transfer switches M1 to M3 by limiting the upper limit of the voltage of the neutral terminal N in the OEW mode.

When starting charging of the battery 10, the controller 40 may turn on the plurality of transfer switches M1 to M3 and control at least one of the first inverter 22 and the second inverter 23 to adjust an external DC voltage applied to the input terminals I1 and I2 so that the battery 10 is charged with the adjusted external DC voltage. In addition, when starting charging of the battery 10, the controller 40 may turn on the clamping switch Tc so as to stabilize the voltage and the current of the battery 10 through the input capacitor Cin and the discharge resistor Rdis.

When charging of the battery 10, the charge switch Tb may be connected to the discharge resistor Rdis and the neutral terminal N in order to prevent loss to the clamping switch Tc according to abnormal turned-off states of the plurality of transfer switches M1 to M3. In the body diode of the charge switch Tb, an anode may be connected to the discharge resistor Rdis, and a cathode may be connected to the neutral terminal N.

Different from the present embodiment, in a situation in which the overvoltage protection circuit 24 is not provided with the charge switch Tb, when the plurality of transfer switches M1 to M3 are abnormally turned off due to a malfunction of the controller 40, loss to the transfer switches M1 to M3, or the like, the current of the neutral terminal N may be conducted to the turned-on clamping switch Tc, thereby causing loss to the overvoltage protection circuit 24.

Thus, when starting charging of the battery 10, the controller 40 as disclosed in the present embodiment may turn off the charge switch Tb so that the neutral terminal N and the discharge resistor Rdis are electrically separated from each other, thereby preventing loss to the clamping switch Tc that would otherwise occur due to abnormally turned-off states of the transfer switches M1 to M3.

When the motor 21 is driven, the charge switch Tb may be turned on by the controller 40 so that the overvoltage protection circuit 24 serves as an RCD snubber circuit.

Different from the present embodiment, as an alternative, the input capacitor Cin and the discharge resistor Rdis may be connected in parallel to the DC terminals D2 and D'2 and the neutral terminal N, and diodes may be connected to the terminals D1 and D'1 and the neutral terminal N, in place of the clamping switch Tc and the charge switch Tb. In this case, the diodes connected to the DC terminals D1 and D'1 and the neutral terminal N may be set to have large current capability in order to prevent loss to the motor driving device 20 that would otherwise occur due to abnormally turned-off states of the transfer switches M1 to M3.

Figure 2:
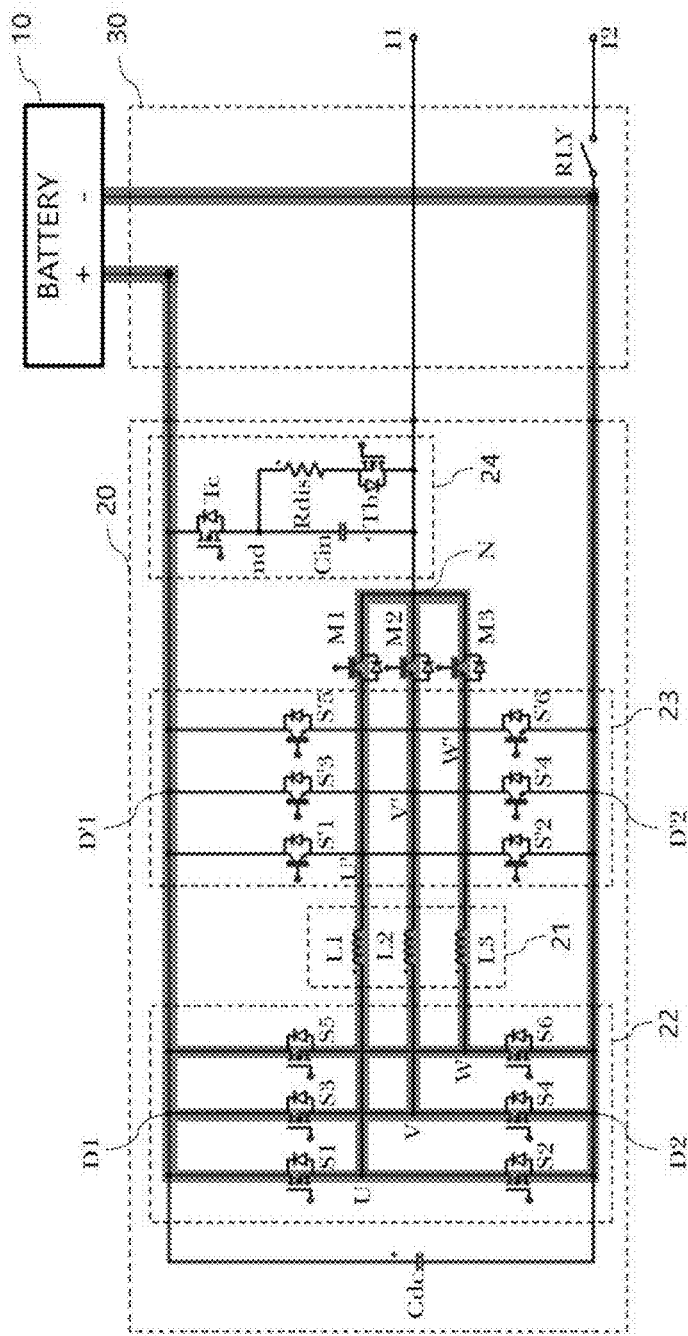
FIG. 2 is a diagram illustrating the CEW mode performed in the electrified vehicle according to an embodiment of the present disclosure.

FIG. 2 is a diagram illustrating the CEW mode performed in the electrified vehicle according to an embodiment of the present disclosure.

As illustrated in FIG. 2, when the motor driving mode is set to the CEW mode, in response to the plurality of transfer switches M1 to M3 being turned on, the other ends of the plurality of coils L1 to L3 may be electrically connected to the neutral terminal N.

As the plurality of legs S1-S2, S3-S4, and S5-S6 are switched by the controller 40 (see FIG. 1) in the CEW mode, the first inverter 22 may convert the DC voltage of the battery 10 into an AC voltage corresponding to each of the plurality of phases and provide the AC voltage corresponding to each of the plurality of phases to one end of each of the plurality of coils L1, L2, and L3, respectively.

All of the plurality of switch elements S'1 to S'6 of the second inverter 23 may be controlled to be in a non-conductive state by the controller 40 (see FIG. 1) in the CEW mode.

Figure 3:
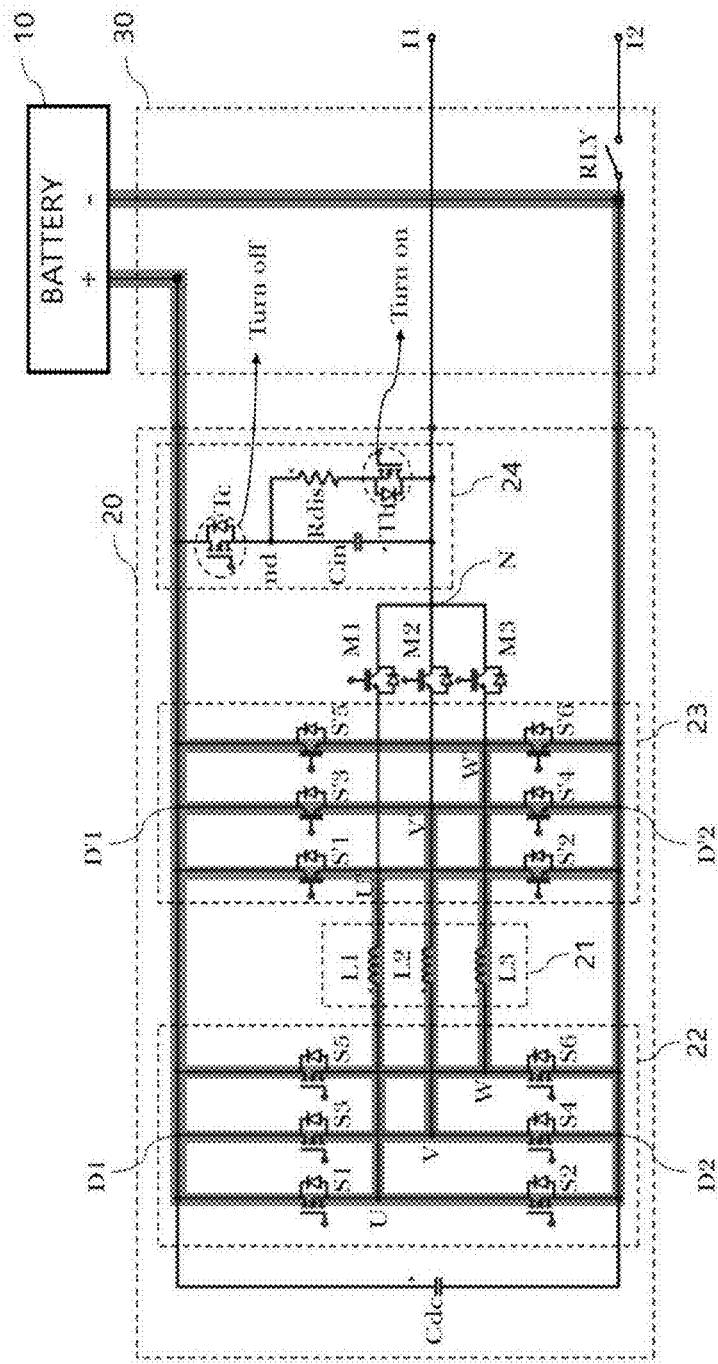
FIG. 3 is a diagram illustrating the OEW mode performed in the electrified vehicle according to an embodiment of the present disclosure.

FIG. 3 is a diagram illustrating the OEW mode performed in the electrified vehicle according to an embodiment of the present disclosure.

As illustrated in FIG. 3, when the motor driving mode is set to the OEW mode, as the plurality of transfer switches M1 to M3 are turned off, the other ends of the plurality of coils L1 to L3 may be electrically separated from the neutral terminal N.

As the plurality of legs S1-S2, S3-S4, and S5-S6 are switched by the controller 40 (see FIG. 1) in the OEW mode, the first inverter 22 may convert the DC voltage of the battery 10 into an AC voltage corresponding to each of the plurality of phases and provide the AC voltage corresponding to each of the plurality of phases to one end of each of the plurality of coils L1, L2, and L3.

Similarly, as the plurality of legs S'1-S'2, S'3-S'4, and S'5-S'6 are switched by the controller 40 (see FIG. 1) in the OEW mode, the second inverter 23 may convert the DC voltage of the battery 10 into an AC voltage corresponding to each of the plurality of phases and provide the AC voltage corresponding to each of the plurality of phases to the other ends of the plurality of coils L1, L2, and L3.

As described above, the clamping switch Tc may be turned off and the charge switch Tb may be turned on so as to limit the upper limit of the voltage of the neutral terminal N increased due to the parasitic inductance of the pattern present between the switch elements.

Figure 4:
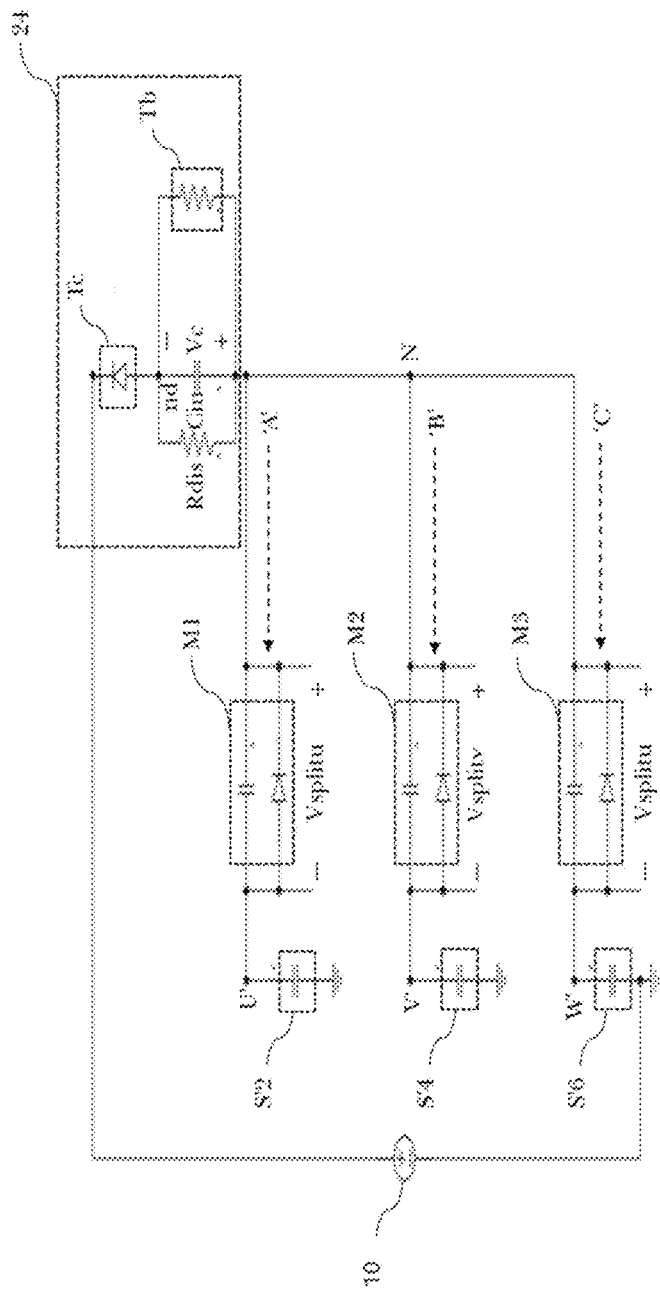
FIGS. 4 and 5 are diagrams illustrating the operation of the overvoltage protection circuit performed in the OEW mode according to an embodiment of the present disclosure.
Figure 5:
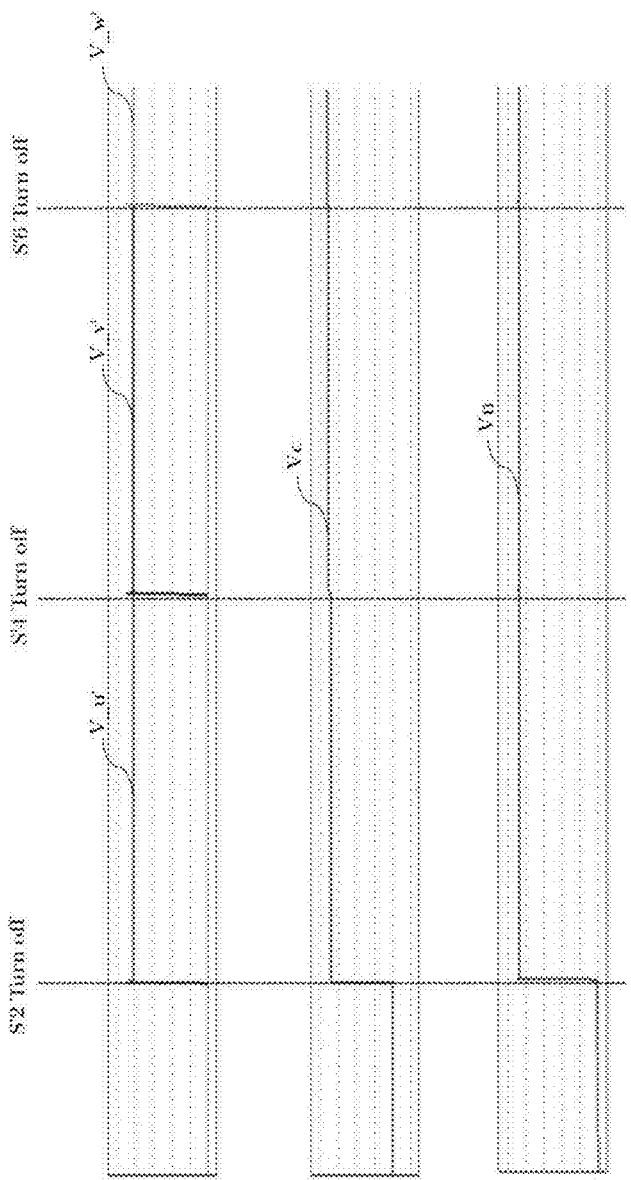

FIGS. 4 and 5 are diagrams illustrating the operation of the overvoltage protection circuit 24 performed in the OEW mode according to an embodiment of the present disclosure.

Referring to FIG. 4, an equivalent circuit of the battery 10, the body capacitors of the bottom switch elements S'2, S'4, and S'6 of the second inverter 23 (see FIG. 1), the body capacitors and the body diodes of the plurality of transfer switches M1 to M3, and the overvoltage protection circuit 24 is illustrated. The overvoltage protection circuit 24 illustrated in FIG. 4 is provided with the body capacitor of the clamping switch Tc, a turn-off resistor of the charge switch Tb, the discharge resistor Rdis, and the input capacitor Cin.

In the OEW mode, the bottom switch elements S'2, S'4, and S'6 of the second inverter 23 (see FIG. 1) may be turned off at phase intervals of 120°. 'A', 'B', and 'C' indicate flows of current of the neutral terminal N when the bottom switch elements S'2, S'4, and S'6 are turned off, respectively. The current of the neutral terminal N may charge the body capacitors of the transfer switches M1 to M3.

As the body capacitors of the transfer switches M1 to M3 are charged, the voltage of the neutral terminal N may be higher than a peak voltage occurring on the AC terminals U', V', and W'. In contrast, the voltage of the AC terminals U', V, and W' may have a negative potential of the battery 10 when the bottom switch elements S'2, S'4, and S'6 are turned on.

Consequently, voltage differences between the neutral terminal N and the AC terminals U', V', and W', i.e., voltage differences, Vsplitu, Vsplitv, and Vsplitw between both ends of the plurality of transfer switches M1 to M3, may be greater than the voltage of the battery 10 in the OEW mode.

The discharge resistor Rdis may discharge charges from the neutral terminal N to the internal node nd in the OEW mode, and the input capacitor Cin may constantly maintain the voltage difference between the neutral terminal N and the internal node nd. The body diode of the clamping capacitor Tc may limit the upper limit of the voltage of the neutral terminal N as a sum of the voltage of the battery 10 and the voltage Vc of the capacitor Cin by discharging charges from the internal node nd to the positive terminal (+) of the battery 10.

Referring to FIG. 5, whenever the bottom switch elements S'2, S'4, and S'6 are sequentially turned off, voltages V_u', V_v', and V_w' may be generated on the AC terminals U', V', and W'. It can be seen that the voltage Vc of the input capacitor Cin and the voltage Vn of the neutral terminal N are constantly maintained when the bottom switch elements S'2, S'4, and S'6 are sequentially turned off.

Figure 6:
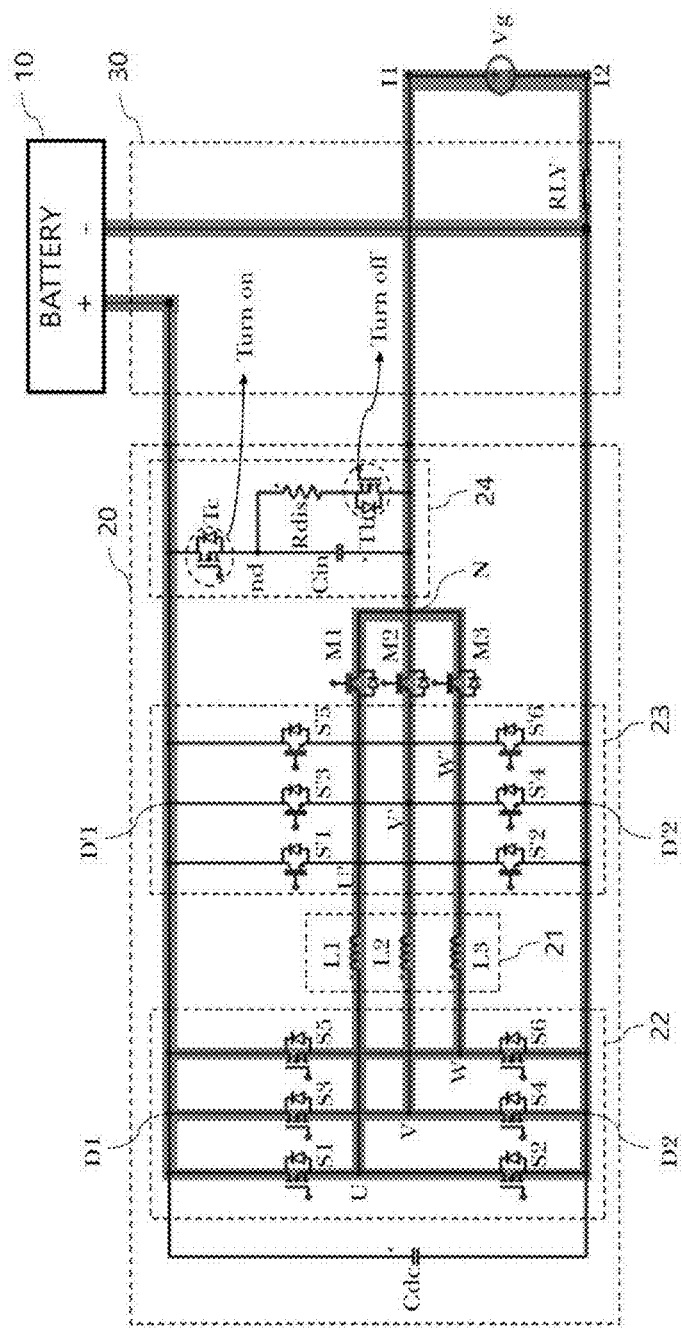
FIGS. 6 and 7 are diagrams illustrating an operation of charging a battery in the motor driving system of the electrified vehicle according to an embodiment of the present disclosure.
Figure 7:
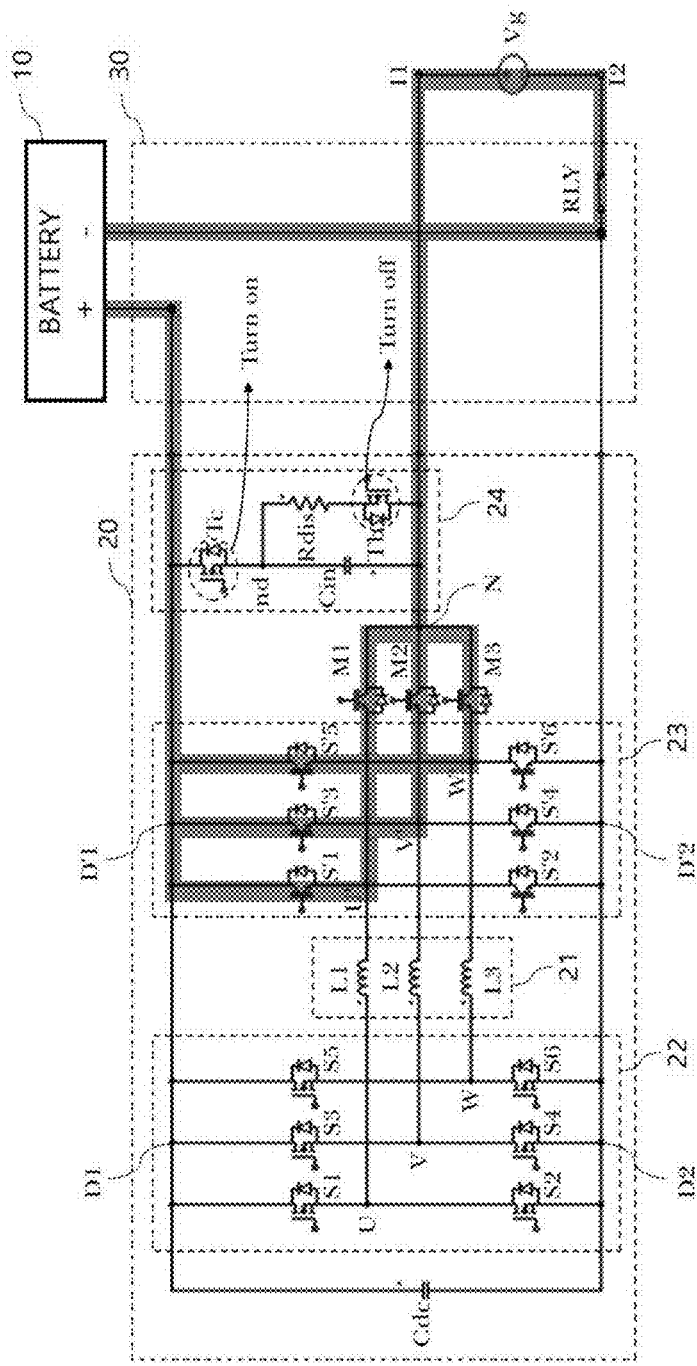

FIGS. 6 and 7 are diagrams illustrating an operation of charging the battery in the motor driving system of the electrified vehicle according to an embodiment of the present disclosure.

FIG. 6 illustrates a situation in which an external DC voltage Vg corresponding to a first voltage is applied to the input terminals I1 and I2, and FIG. 7 illustrates a situation in which an external DC voltage Vg corresponding to a second voltage higher than the first voltage is applied to the input terminals I1 and I2.

The first voltage and the second voltage may be set variously as disclosed in the embodiments. For example, when the voltage of the battery 10 is 800 V, the first voltage may be set to 400 V lower than the voltage of the battery 10, and the second voltage may be set to 800 V the same as the voltage of the battery 10.

When starting charging of the battery 10, the charge relay RLY of the junction block 30 may be turned on, and the plurality of transfer switches M1 to M3 may be turned on so that the neutral terminal N is electrically connected to the other ends of the plurality of coils L1 to L3.

Referring to FIG. 6, when the external DC voltage Vg corresponds to the first voltage lower than the voltage of the battery 10, the controller 40 (see FIG. 1) may switch the plurality of legs S1-S2, S3-S4, and S5-S6 of the first inverter 22, and the first inverter 22 may output the external DC voltage Vg to the battery 10 by boosting the external DC voltage Vg.

Referring to FIG. 7, when the external DC voltage Vg corresponds to the second voltage the same as the voltage of the battery 10, the controller 40 (see FIG. 1) may control the top-switch elements S'1, S'3, and S'5 of the second inverter 23 in a turned-on state, and the second inverter 23 may output the external DC voltage Vg to the battery 10 by maintaining the external DC voltage Vg.

Referring to FIGS. 6 and 7, when starting charging of the battery 10, as the clamping switch Tc is turned on, the input capacitor Cin and the discharge resistor Rdis may stabilize the voltage and current of the battery 10. In addition, the charge switch Tb may be turned off to block the current of the neutral terminal N from flowing to the discharge resistor Rdis due to abnormal turned-off states of the transfer switches M1 to M3.

Figure 8:
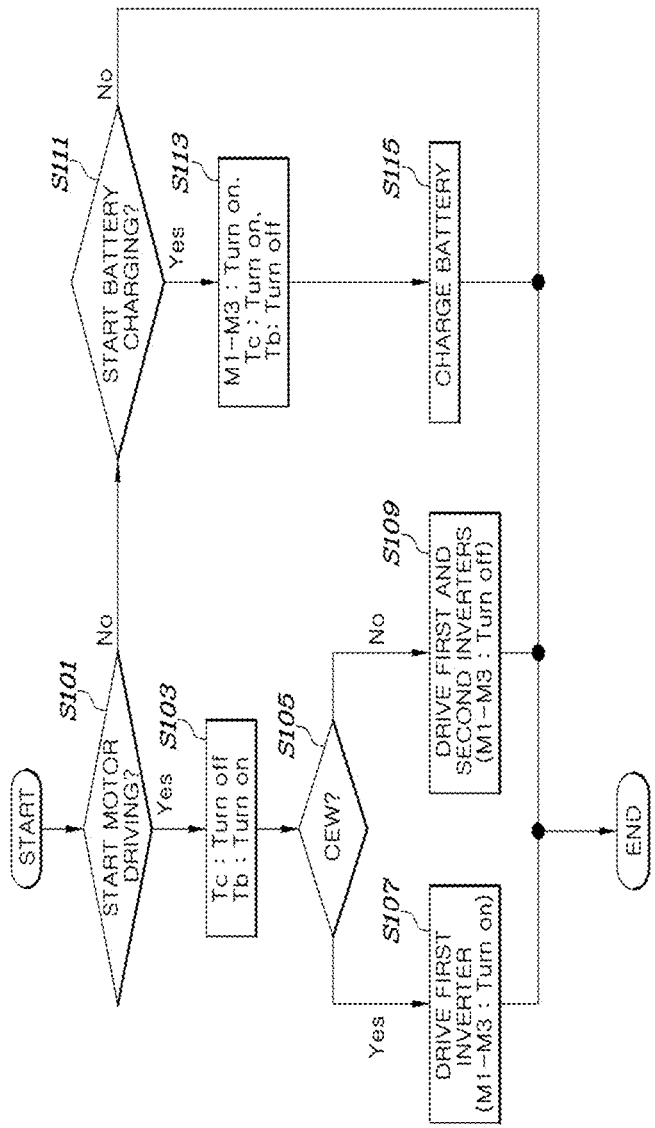
FIG. 8 is a flowchart illustrating a method of controlling an electrified vehicle according to an embodiment of the present disclosure.

FIG. 8 is a flowchart illustrating a method of controlling an electrified vehicle according to an embodiment of the present disclosure.

Referring to FIG. 8, the controller 40 may determine whether or not the motor 21 is started to be driven in S101.

When the motor 21 is driven by at least one of the first and second inverters 22 and 23 (YES in S101), the controller 40 may turn the clamping switch Tc off and the charge switch Tb on so that current from the neutral terminal N flows to the DC terminals D1 and D'1 through the of the clamping switch Tc in S103.

The controller 40 may determine the setting of the motor driving mode in S105.

When the motor driving mode is set to the CEW mode (YES in S105), the controller 40 may turn on the plurality of transfer switches M1 to M3, switch the plurality of legs S1-S2, S3-S4, and S5-S6 of the first inverter 22, and control the plurality of switch elements S'1 to S'6 of the second inverter 23 to be in an electrically non-conductive state so that the plurality of coils L1, L2, and L3 of the motor 21 form a neutral point in S107.

When the motor driving mode is set to the OEW mode (NO in S105), the controller 40 may turn off the plurality of transfer switches M1 to M3 and switch the plurality of legs S1-S2, S3-S4, and S5-S6 of the first inverter 22 and the plurality of legs S'1-S'2, S'3-S'4, and S'5-S'6 of the second inverter 23 so that the plurality of coils L1, L2, and L3 of the motor 21 form no neutral point in S109.

When the motor 21 is not driven (NO in S101), the controller 40 may determine whether or not to start charging of the battery 10 according to whether or not an external DC voltage is applied to the input terminals I1 and I2 in S111. When charging of the battery 10 is not started (NO in S111), the control operation of the electrified vehicle may be stopped.

When charging of the battery 10 is started (YES in S111), the controller 40 may turn on the plurality of transfer switches M1 to M3 so that at least one of the first and second inverters 22 and 23 charge the battery 10 by adjusting the external DC voltage. In addition, the controller 40 may turn on the clamping switch Tc, and turn off the charge switch Tb so that the neutral terminal N and the discharge resistor Rdis are electrically separated in s113.

The controller 40 may charge the battery 10 by adjusting the external DC voltage applied to the input terminals I1 and I2 using at least one of the first and second inverters 22 and 23 in S115.

What is claimed is:

1. An electrified vehicle comprising:
a motor comprising a plurality of coils;
a first inverter having a DC terminal, and comprising a plurality of legs respectively connected to one end of each of the plurality of coils;
a second inverter connected to the DC terminal, and comprising a plurality of legs respectively connected to the other end of each of the plurality of coils;
a plurality of transfer switches respectively having one end connected to a neutral terminal for the plurality of coils and the other end connected to the other end of each of the plurality of coils;
an overvoltage protection circuit comprising a clamping switch, a resistor, and a capacitor, and connected to the neutral terminal and the DC terminal; and
a controller controlling a turned-on state of the plurality of transfer switches according to a motor driving mode, wherein, when the motor is driven, the controller controls a turned-on state of the clamping switch.

2. The electrified vehicle of claim 1, further comprising a battery, wherein the DC terminal is connected to a positive terminal of the battery.

3. The electrified vehicle of claim 1, further comprising an internal node, wherein the resistor and the capacitor are connected in parallel to the neutral terminal and the internal node, and
the clamping switch is connected to the DC terminal and the internal node.

4. The electrified vehicle of claim 3, wherein, when driving the motor, the controller turns off the clamping switch so that current from the neutral terminal flows to the DC terminal through a body diode of the clamping switch.

5. The electrified vehicle of claim 4, wherein the body diode of the clamping switch is configured such that an anode is connected to the internal node and a cathode is connected to the DC terminal.

6. The electrified vehicle of claim 3, wherein, when starting charging of a battery, the controller turns on the plurality of transfer switches and the clamping switch so that at least one of the first and second inverters charges the battery by adjusting an external DC voltage.

7. The electrified vehicle of claim 3, wherein the over-voltage protection circuit further comprises a charge switch connected to the resistor and the neutral terminal, and
when starting charging of a battery, the controller turns off the charge switch so that the neutral terminal and the resistor are electrically separated.

8. The electrified vehicle of claim 7, wherein a body diode of the charge switch is configured such that an anode is connected to the resistor and a cathode is connected to the neutral terminal.

9. The electrified vehicle of claim 7, wherein, when driving the motor, the controller turns on the charge switch.

10. The electrified vehicle of claim 1, wherein the motor driving mode includes a closed-end winding mode and an open-end winding mode, and
the controller turns on the plurality of transfer switches when the motor driving mode is set to the closed-end winding mode, and turns off the plurality of transfer switches when the motor driving mode is set to the open-end winding mode.

11. The electrified vehicle of claim 10, wherein, when the motor driving mode is set to the closed-end winding mode, the controller switches the plurality of legs of the first inverter and controls switch elements disposed in the plurality of legs of the second inverter to be in an electrically non-conductive state.

12. The electrified vehicle of claim 10, wherein, when the motor driving mode is set to the open-end winding mode, the controller switches the plurality of legs of the first inverter and the plurality of legs of the second inverter.

13. The electrified vehicle of claim 1, wherein, when an external DC voltage for charging a battery corresponds to a first voltage, the first inverter outputs an external DC voltage to the battery by boosting the external DC voltage, and
when the external DC voltage corresponds to a second voltage higher than the first voltage, the second inverter outputs the external DC voltage by maintaining the external DC voltage.

14. A method of controlling an electrified vehicle, the method comprising:
controlling, by a controller in response to driving a motor having a plurality of coils, a turned-on state of a clamping switch connected to a neutral terminal for the plurality of coils and DC terminals of first and second inverters; and
controlling, by the controller, a turned-on state of a plurality of transfer switches connected to the neutral terminal and the other ends of the plurality of coils according to a motor driving mode,
wherein the first inverter is connected to one end of each of the plurality of coils, and the second inverter is connected to the other ends of the plurality of coils.

15. The method of claim 14, wherein the controlling of the turned-on state of the clamping switch comprises turning off, by the controller, the clamping switch so that current from the neutral terminal flows to the DC terminals through a body diode of the clamping switch.

16. The method of claim 14, further comprising turning on, by the controller in response to starting charging of a battery, the clamping switch,
wherein one end of the clamping switch is connected to the DC terminals, and the other end of the clamping switch is connected to the neutral terminal through a resistor and a capacitor connected in parallel.

17. The method of claim 16, further comprising turning on, by the controller, the plurality of transfer switches so that at least one of the first and second inverters charges the battery by adjusting an external DC voltage when starting charging of the battery.

18. The method of claim 16, further comprising turning off, by the controller in response to starting charging of the battery, a charge switch connected to the resistor and the neutral terminal.

19. The method of claim 18, further comprising turning on, by the controller in response to driving the motor, the charge switch.

20. The method of claim 14, wherein the controlling of the turned-on state of the plurality of transfer switches comprises:
turning on, by the controller in response to the motor driving mode being set to a closed-end winding mode, the plurality of transfer switches; and
turning off, by the controller in response to the motor driving mode being set to an open-end winding mode, the plurality of transfer switches.

* * * * *